United States Patent
Poremba

(10) Patent No.: US 6,516,674 B1
(45) Date of Patent: Feb. 11, 2003

(54) MASS FLOW MEASURING INSTRUMENT

(75) Inventor: Andreas Poremba, Bundesrepublik (DE)

(73) Assignee: Krohne A.G. (CH)

( * ) Notice: Subject to any disclaimer, the term of this patent is extended or adjusted under 35 U.S.C. 154(b) by 0 days.

(21) Appl. No.: 09/530,476

(22) PCT Filed: Sep. 7, 1999

(86) PCT No.: PCT/EP99/06561

§ 371 (c)(1),
(2), (4) Date: Aug. 7, 2000

(87) PCT Pub. No.: WO00/14485

PCT Pub. Date: Mar. 16, 2000

(30) Foreign Application Priority Data

Sep. 8, 1998 (DE) .......................................... 198 40 782

(51) Int. Cl.$^7$ ................................................. G01F 1/84

(52) U.S. Cl. ............................. 73/861.357; 73/861.355

(58) Field of Search ..................... 73/861.357, 861.354, 73/861.355

(56) References Cited

U.S. PATENT DOCUMENTS

| | | | | |
|---|---|---|---|---|
| 4,793,191 A | * | 12/1988 | Flecken et al. | 73/861.357 |
| 4,831,885 A | * | 5/1989 | Dahlin | 138/30 |
| 5,069,075 A | * | 12/1991 | Hansen et al. | 73/861.18 |
| 5,323,658 A | * | 6/1994 | Yao et al. | 73/861.355 |
| 5,381,697 A | * | 1/1995 | van der Pol | 73/861.37 |
| 5,497,665 A | * | 3/1996 | Cage et al. | 73/861.356 |
| 5,691,485 A | * | 11/1997 | Endo et al. | 73/861.357 |
| 5,736,653 A | * | 4/1998 | Drahm et al. | 73/861.356 |
| 5,773,727 A | * | 6/1998 | Kishiro et al. | 73/861.355 |
| 5,796,012 A | | 8/1998 | Gomi et al. | 73/861 |
| 6,006,609 A | * | 12/1999 | Drahm et al. | 73/861.355 |

FOREIGN PATENT DOCUMENTS

| | | |
|---|---|---|
| DE | 4124296 C2 | 2/1992 |
| DE | 4124295 C2 | 1/1993 |
| DE | 4143361 A1 | 3/1993 |
| DE | 4224379 C1 | 12/1993 |
| DE | 4224379 C2 | 12/1993 |
| DE | 4423168 A1 | 1/1996 |
| DE | 19710 806 A1 | 11/1997 |
| DE | 19632 500 A1 | 2/1998 |
| EP | 0521 439 A2 | 1/1993 |
| EP | 0596 178 A1 | 5/1994 |
| EP | 0598 287 A1 | 5/1994 |
| EP | 95/03528 | 7/1994 |
| EP | 0759 542 A1 | 2/1997 |
| EP | 0831 306 A1 | 3/1998 |
| EP | 0849 568 A1 | 6/1998 |

OTHER PUBLICATIONS

Coriolos–MassedurchfluBmessung–Gerades Einrohrsystem mit neuer Schwingungskompensation, Wolfgang Drahm and Christian Matt, MENGENMESSTECHNIK, 1998.

Vielseitig einsetzbar durch die gleichzeitige Bestimmung von Masse, Dichte und Temperatur Fur Flussigkeiten und Gase, Endress+Hauser, Mar. 8, 1998.

(List continued on next page.)

Primary Examiner—Harshad Patel
Assistant Examiner—Lilybett Martir
(74) Attorney, Agent, or Firm—Cesari and McKenna, LLP

(57) ABSTRACT

A mass flowmeter operating by the Coriolis principle, with one essentially straight fluid-conducting Coriolis measuring tube, at least one oscillator associated with and exciting the Coriolis measuring tube, at least one detector associated with the Coriolis measuring tube and capturing the Coriolis forces and/or the Coriolis oscillations generated by Coriolis forces, and a compensating cylinder in which the Coriolis measuring tube is mounted by way of a mechanical connection to the compensating cylinder. The measuring accuracy of the mass flowmeter is further improved to a considerable extent by balancing both the excitation oscillation and the Coriolis oscillation of the Coriolis measuring tube within the compensating cylinder.

8 Claims, 2 Drawing Sheets

OTHER PUBLICATIONS

Zulassung des CORIMASS G–Gerates zum eichpflichtigen Verkehr, Krohne MeBtechnik GmbH & Co. KG.
Patent Abstract of Japan, Publication No.: 10104040A.
Patent Abstract of Japan, Publication No.: 10090034A.
Patent Abstract of Japan, Publication No.: 08304138A.
Patent Abstract of Japan, Publication No.: 08219841A.
Patent Abstract of Japan, Publication No.: 07333030A.
Patent Abstract of Japan, Publication No.: 07071989A.
Patent Abstract of Japan, Publication No.: 07035582A.

* cited by examiner

MASS FLOW MEASURING INSTRUMENT

This invention relates to a mass flowmeter designed to operate by the Coriolis principle, with one essentially straight, fluid-conducting Coriolis measuring tube, at least one oscillator associated with and exciting the Coriolis measuring tube, at least one detector associated with the Coriolis measuring tube and capturing the Coriolis forces and/or the Coriolis oscillations generated by Coriolis forces, and a compensating cylinder in which the Coriolis measuring tube is mounted and mechanically connected to the compensating cylinder.

The above states that the mass flowmeter in question incorporates, among other components, at least one oscillator "associated" with the Coriolis measuring tube as well as at least one detector "associated" with the Coriolis measuring tube. Typically, the oscillator or oscillators, or at least part of the oscillator(s), and the detector or detectors or at least part of the detector(s), are connected to the Coriolis measuring tube. However, since such connection is not imperative, the term used herein is "associated" rather than "connected".

One generally differentiates between two basic types of mass flowmeters operating by the Coriolis principle, one employing a more or less straight Coriolis measuring tube, the other a looped Coriolis measuring tube. As another differentiating feature, there are mass flowmeters with only one Coriolis measuring tube and those with two Coriolis measuring tubes, in the latter case configured to permit either parallel or in-line flow of the fluid.

More recently, mass flowmeters employing only one essentially straight Coriolis measuring tube have increasingly gained in popularity. Compared to mass flowmeters employing either two straight Coriolis measuring tubes or one looped Coriolis measuring tube, Coriolis mass flowmeters with only one straight measuring tube offer significant advantages. The advantage over mass flowmeters with two straight Coriolis measuring tubes lies primarily in the fact that, unlike mass flowmeters with two Coriolis measuring tubes, single-tube designs do not require a flow divider or flow combiner. Compared to single looped or dual looped Coriolis measuring tubes, the principal advantage of the straight tube design lies in the fact that it is easier to manufacture than a looped Coriolis measuring tube, that there is less of a pressure drop in a straight Coriolis measuring tube than in a looped Coriolis measuring tube, and that a straight Coriolis measuring tube is easier to clean than a looped Coriolis measuring tube.

Nevertheless, all these advantages notwithstanding, mass flowmeters with only one straight Coriolis measuring tube present a variety of problems.

First of all, in a straight Coriolis measuring tube, thermal expansion and stress inherently cause variations in the measuring accuracy as a function of the temperature of the moving fluid. In extreme cases, thermal stress can even lead to mechanical damage such as stress cracks in the Coriolis measuring tube.

The above-mentioned problems with mass flowmeters employing straight Coriolis measuring tubes have already been addressed by industry experts (reference is made in particular to the German patent 41 24 295, the German patent disclosure 41 43 361 and the German patent 42 24 379). The problems have been largely solved, on the one hand, by connecting the Coriolis measuring tube to the compensating cylinder in such fashion that any relative movement in the axial direction is inhibited, whereby the axial distance of the connecting point between the Coriolis measuring tube and the compensating cylinder defines the length of oscillation of the Coriolis measuring tube; and, on the other hand, by positioning the Coriolis measuring tube within the compensating cylinder in a tensile-prestressed state (German patent 41 24 295) and/or by producing the Coriolis measuring tube and the compensating cylinder from materials having identical or nearly identical coefficients of thermal expansion (German patent disclosure 41 43 361), and/or by providing a length-variation sensor capable of detecting changes in the oscillation length of the Coriolis measuring tube and of correcting the measurements for oscillation length and stress variations (German patent 42 24 379). In general, it has been possible to produce a Coriolis-type mass flowmeter employing a single straight Coriolis measuring tube with a measuring accuracy of within about 0.1% (ref. prospectus "Certification of the Corimass G Instrument for Applications Subject to Calibration Regulations", issued by KROHNE Messtechnik GmbH & Co. KG).

However, mass flowmeters operating by the Coriolis principle and employing one straight Coriolis measuring tube also have an inherent drawback (ref. European patent disclosure 0 521 439):

It is necessary for the Coriolis measuring tube or tubes used in mass flowmeters operating by the Coriolis principle to oscillate under the action of at least one oscillator. It is, after all, the oscillation of the Coriolis measuring tube or tubes and the flow of mass through the Coriolis measuring tube or tubes that generate the Coriolis forces or Coriolis oscillations.

In mass flowmeters employing two straight Coriolis measuring tubes or one or two looped Coriolis measuring tube(s), the Coriolis measuring tubes or the active oscillating sections of the looped Coriolis measuring tubes are identical in design and are so positioned and excited that they oscillate in mutually opposite directions. As a desirable result, the overall oscillating structure has no external vibratory effect. The center of inertia remains stationary, compensating for any forces encountered. It follows that no oscillations are introduced into a pipeline system in which this type of mass flowmeter is installed, so that no pipeline vibrations affect the accuracy of the measurements.

Of course, Coriolis-type mass flowmeters employing only one straight Coriolis measuring tube do not offer the benefit of mutually counter-oscillating measuring tubes. The center of mass does not remain stationary and there is no compensation for impinging forces. As a result, a mass flowmeter of this type, when installed in a pipeline, will transfer vibrations into the pipe which, in turn, can affect the measuring accuracy. Industry experts have already addressed the task of minimizing the introduction of extraneous interferences, i.e. vibrations in the surrounding pipeline structure (ref German patent disclosures 44 23 168 and 196 32 500).

To neutralize the aforementioned problems which are peculiar to Coriolis-type mass flowmeters employing only one straight Coriolis measuring tube, the pipeline system in which the mass flowmeter is installed is often provided with additional clamp-down devices. Typically, the pipe through which the fluid flows to the mass flowmeter and the pipe through which the fluid is carried away from the mass flowmeter are clamped down at spatial intervals corresponding to ten to fifteen times the pipe diameter.

Another proposed approach to solving the aforementioned problems which are peculiar to mass flowmeters operating by the Coriolis principle and employing only one straight Coriolis measuring tube has been to install so-called antiresonators at the point where the Coriolis measuring tube is mounted, which antiresonators should have a resonant spectrum of a bandwidth that matches at least one intrinsic, natural oscillation of the Coriolis measuring tube (ref. European patent disclosure 0 521 439). It has been found, however, that in the case of mass flowmeters which are very accurate to begin with, this approach offers no further improvement in terms of measuring accuracy or error reduction.

Another proposed approach, especially for a mass flowmeter employing only one straight Coriolis measuring tube, has been to mount on the compensating cylinder an equalizing unit symmetrical in design and symmetrically positioned relative to the center of the Coriolis measuring tube (German patent disclosure 197 10 806). That equalizing unit must be so designed that the oscillation amplitude of the compensating cylinder is minimized and preferably close to zero.

It is the objective of this invention to further improve the above-referenced existing design of the Coriolis-type mass flowmeter by addressing the problems, detailed above, that are associated with the use of only one straight Coriolis measuring tube.

The mass flowmeter according to this invention which solves these problems, is basically and essentially characterized by a balancing of both the excitation oscillation and the Coriolis oscillation of the Coriolis measuring tube within the compensating cylinder. The term "balancing" in this case means that neither the excitation oscillation nor the Coriolis oscillation affects the compensating cylinder. In other words, neither the excitation oscillation nor the Coriolis oscillation generates any "compensating-cylinder oscillation" so that the compensating cylinder remains "quiescent" and unaffected. This invention thus recognizes and addresses the fact that any further improvement in the design of a Coriolis-type mass flowmeter employing only one essentially straight Coriolis measuring tube is attainable only by keeping the center of mass of the entirety of the components within the compensating cylinder, meaning the center of mass of the complete assembly consisting of the Coriolis measuring tube, the oscillator or oscillators and the detector or detectors, at a fixed, stationary point. If the compensating cylinder houses any additional components, they must, of course, be included in the concept of a "stationary center of mass".

There are several specific possibilities to implement this concept of a "stationary center of mass".

Given that both the excitation oscillation and the Coriolis oscillation of the Coriolis measuring tube tend to shift the center of mass of the assembly consisting of the Coriolis measuring tube, the oscillator or oscillators and the detector or detectors, these components inside the compensating cylinder must be equipped with an equalizing mass, i.e. compensatory balancing elements produced, dimensioned and configured in such fashion as to keep the center of mass of the entire assembly comprising the Coriolis measuring tube, the oscillator(s), the detector(s) and the balancing elements at a fixed stationary point.

In a preferred embodiment version of the mass flowmeter according to this invention, balancing elements are connected to the Coriolis measuring tube preferably in a symmetrical relation to the center axis of the Coriolis measuring tube. In a symmetrical configuration relative to its center axis, the Coriolis measuring tube is provided with retaining devices to which the balancing elements are attached. The retaining devices must be so configured, and the balancing elements so attached, that both the excitation oscillation and the Coriolis oscillation of the Coriolis measuring tube produce compensatory balancing oscillations in the balancing elements.

It is also possible to use, in lieu of retaining devices and identical balancing elements symmetrically arranged relative to the center axis of the Coriolis measuring tube, retaining devices asymmetrically positioned in relation to the center axis of the Coriolis measuring tube, in which case it will be necessary to vary the dimensions of the balancing elements in such fashion that the center of mass of the entire assembly comprising the Coriolis measuring tube, the oscillator(s), the detector(s), the retaining devices and the balancing elements remains stationary.

In addition, the Coriolis measuring tube of the mass flowmeter according to this invention may be provided with a conventional, centrally mounted balancing or equalizing pendulum. This equalizing pendulum may modify the frequency and amplitude of the excitation oscillation of the Coriolis measuring tube.

A preferred embodiment of the mass flowmeter according to this invention is characterized by a symmetrical balancing assembly provided in the compensating cylinder in an essentially symmetrical arrangement relative to the center axis of the Coriolis measuring tube. This balancing assembly may itself be a system capable of oscillating, consisting of a balancing element and an equalizing spring. For a particular design of such a balancing assembly, reference is made to the German patent disclosure 197 10 806 the contents of which is hereby expressly made a part of this present disclosure.

The balancing assembly referred to above can serve to eliminate or at least minimize any residual "compensating-cylinder oscillation". Any such residual "compensating-cylinder oscillation" may be attributable to a fluid, flowing through the Coriolis measuring tube, the density of which differs from that of the fluids normally passing through the Coriolis measuring tube. As a rule, mass flowmeters including the mass flowmeter according to this invention are designed for a fluid of a specific density. For the mass flowmeter according to the invention, this implies that the concept of a "stationary center of mass" must also take into account the respective specific density of the fluid in the Coriolis measuring tube, and that the aforementioned balancing assembly must counteract any impact on the "stationary center of mass" caused by a density variation of the fluid.

The mass flowmeter according to this invention can be designed and further enhanced in numerous ways. In this context, reference is made to the subclaims following patent claim 1 and to the description of a preferred embodiment in conjunction with the drawings in which:

Figure 1:
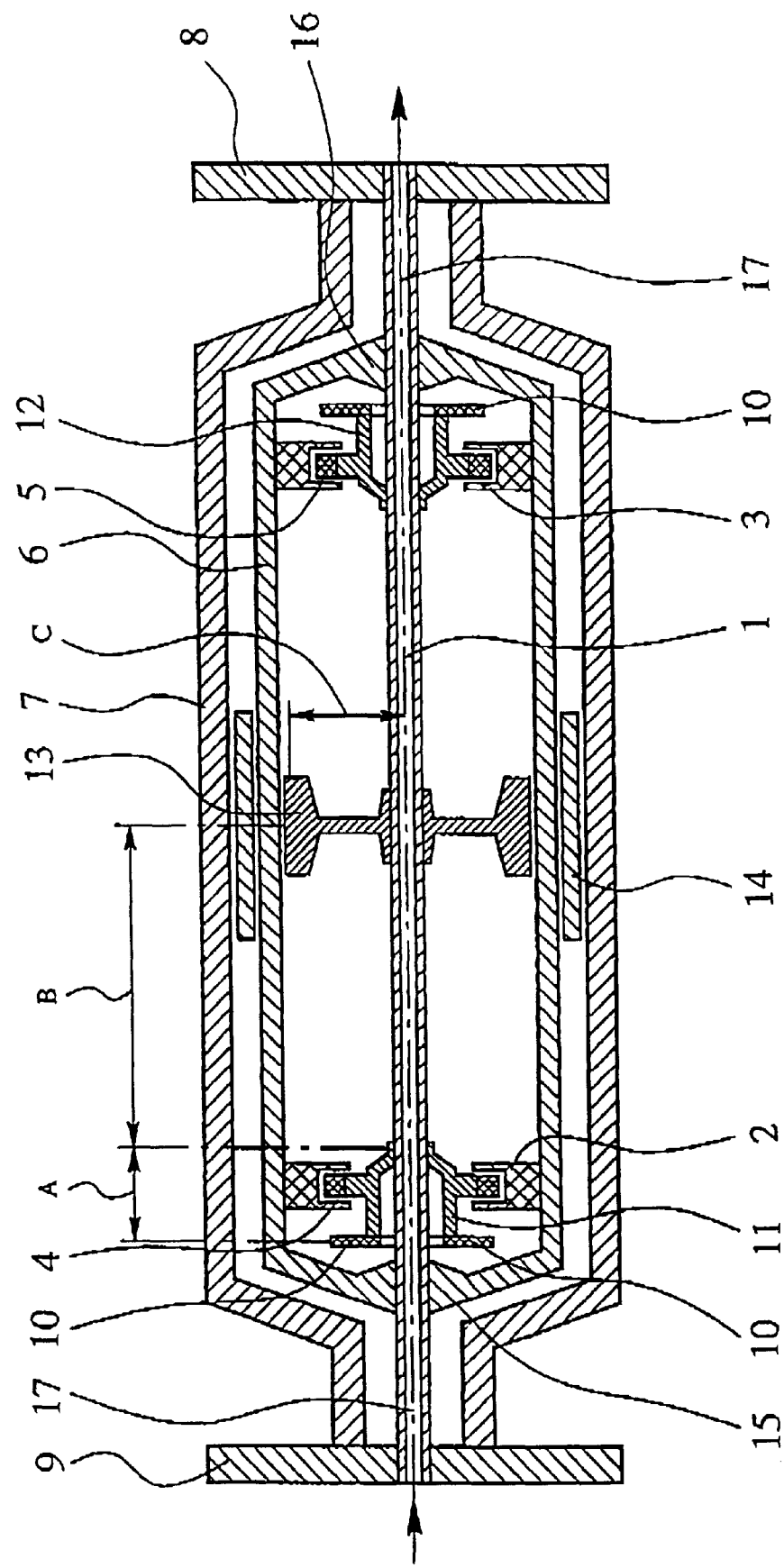
FIG. 1 shows a longitudinal section through a preferred embodiment of a mass flowmeter according to this invention.

FIG. 1 shows a moving-fluid mass flowmeter operating by the Coriolis principle, incorporating a straight, fluid-conducting Coriolis measuring tube 1, two oscillators 2, 3, two detectors 4, 5 serving to measure the Coriolis forces and/or the Coriolis oscillations derived from Coriolis forces, and a compensating cylinder 6 through which no fluid flows. The Coriolis measuring tube 1 is positioned inside the compensating cylinder 6 and mechanically connected to the same. FIG. 1 also shows an outer protective housing 7 which should be as rigid as possible and which is provided with two lateral mounting flanges 8, 9. In lieu of the two oscillators 2, 3 and two detectors 4, 5 as shown in FIG. 1, it is equally possible to use only one oscillator which in that case should preferably contact the center of the Coriolis measuring tube 1, or only one detector.

According to this invention, the excitation oscillation and the Coriolis oscillation of the Coriolis measuring tube I are balanced within the compensating cylinder 6, meaning that neither the excitation oscillation nor the Coriolis oscillation affects the compensating cylinder 6. Not being excited by the excitation oscillation nor by the Coriolis oscillation into generating a "compensating-cylinder oscillation", the compensating cylinder 6 remains motionless or "quiescent". According to the invention, it has been established that a further improvement of a Coriolis-type mass flowmeter with only one straight Coriolis measuring tube 1 is attainable by keeping the center of mass of all the components within the compensating cylinder 6, i.e. the center of mass of the entire assembly encompassing the Coriolis measuring tube 1, the oscillators 2, 3, the detectors 4, and any other components discussed further below, fixed in a stationary position.

In the design embodiment illustrated, this "stationary center of mass" is obtained in the following manner:

Given that both the excitation oscillation and the Coriolis oscillation of the Coriolis measuring tube 1 tend to shift the center of mass of the assembly consisting of the Coriolis measuring tube 1, the oscillators 2, 3 and the detectors 4, 5, these components inside the compensating cylinder 6 must be equipped with an equalizing mass, i.e. compensatory balancing elements 10 produced, dimensioned and configured in such fashion as to keep the center of mass of the entire assembly comprising the Coriolis measuring tube 1, the oscillators 2, 3, the detectors 4, 5 and the balancing elements 10 at a fixed stationary point in spite of the excitation oscillation and the Coriolis oscillation.

In the embodiment illustrated in FIG. 1, the balancing elements 10 are positioned in a symmetric arrangement relative to the center transverse axis M (FIG. 2) of the Coriolis measuring tube 1. To that end, the Coriolis measuring tube 1 is equipped with retaining devices 11, 12 positioned in a symmetric arrangement relative to the center transverse axis M of the Coriolis measuring tube 1 and holding the balancing elements 10. In the embodiment shown, the retaining devices 11, 12 are in the form of relatively rigid tubular elements to each of which two balancing elements 10 are attached.

In the embodiment according to FIG. 1, parts of the oscillators 2, 3 and parts of the detectors 4, 5 are attached to the retaining devices 11, 12; the remaining parts of the oscillators 2, 3 and, respectively, of the detectors 4, 5 are attached to the compensating cylinder 6.

Figure 2:
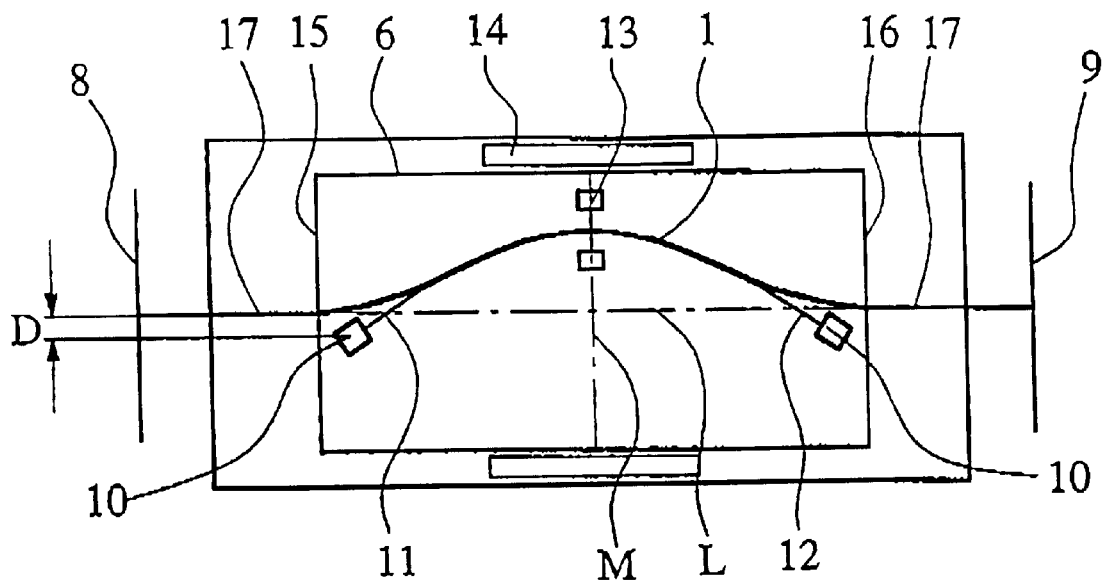
FIG. 2 is a schematic illustration of the mass flowmeter of FIG. 1, with an excitation oscillation extremely exaggerated in quantitative terms.
Figure 3:
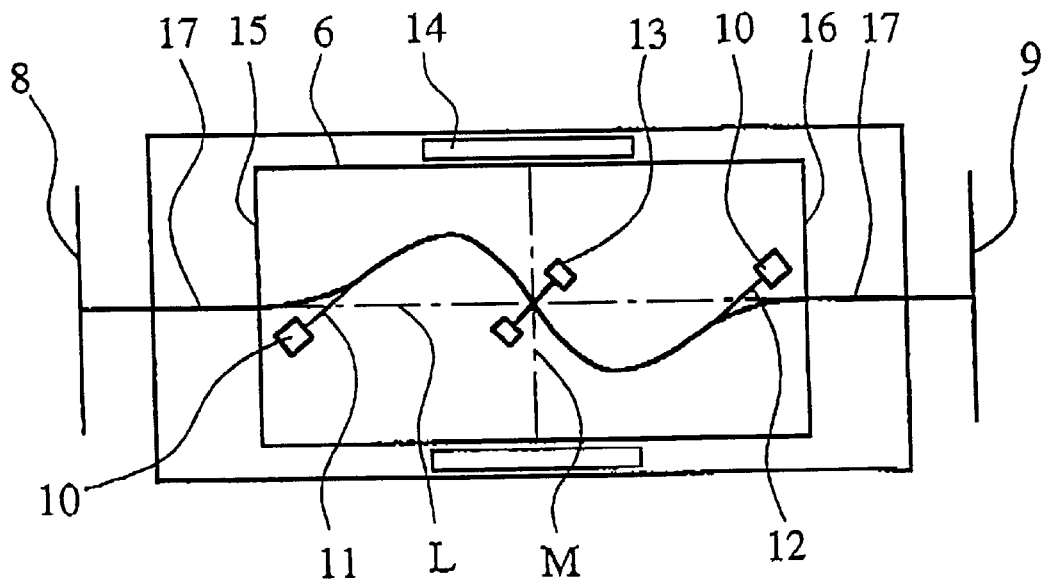
FIG. 3 is a schematic illustration of the mass flowmeter according to FIG. 1, with a Coriolis oscillation extremely exaggerated in quantitative terms.

In addition, as shown in FIGS. 1 to 3, the Coriolis measuring tube 1 is equipped with a centrally positioned equalizing pendulum 13. This equalizing pendulum 13 can modify the frequency and amplitude of the excitation oscillation of the Coriolis measuring tube 1.

In the embodiment of a mass flowmeter according to this invention, as shown in FIG. 1, the compensating cylinder 6 is further equipped with a symmetrically configured balancing assembly 14 extending in an essentially symmetric fashion relative to the center axis M of the Coriolis measuring tube 1. In a manner not illustrated, this balancing assembly 14 may itself be designed to be capable of oscillating, consisting of a balancing element and an equalizing spring. With regard to the particular design of the balancing assembly 14, reference is made to the German patent disclosure 197 10 806 the substance of which is expressly included in this present disclosure.

The balancing assembly 14 provided in the compensating cylinder 6 can serve to eliminate or at least minimize any residual "compensating-cylinder oscillation". As explained further above, any such residual "compensating-cylinder oscillation" may be attributable to a fluid, flowing through the Coriolis measuring tube 1, the density of which differs from that of the fluids normally passing through the Coriolis measuring tube 1.

The problem posed by a "compensating-cylinder oscillation", attributable to a fluid flowing through the Coriolis measuring tube 1 at a density different from that of fluids normally passing through the Coriolis measuring tube 1, may also be addressed by selecting the degree of rigidity for the retaining devices 11, 12 supporting the balancing elements 10 in such manner that the amplitude of the balancing oscillation adapts itself to changes in the density of the fluid flowing through the Coriolis measuring tube 1. It is recommended in this case to select the frequency of the excitation oscillation to be different from the resonant frequency of the system derived from the balancing elements 10 and the retaining devices 11, 12. This is based on the following:

As in the current state of the art, the frequency of the excitation oscillation in the mass flowmeter according to this invention can be so selected or controlled that it causes the Coriolis measuring tube 1 to oscillate at the resonant frequency. Whenever the resonant frequency changes, for instance by a change in the density of the moving fluid, the frequency of the excitation oscillation is changed accordingly. Now, if the resonant frequency of the system derived from the balancing elements 10 and the retaining devices 11, 12 is specifically selected to differ from the frequency of the excitation oscillation, any density-dependent change in the frequency of the excitation oscillation will result in the desired change of the amplitude of the equalizing oscillation.

As is indicated in FIG. 2 for the design example illustrated, the Coriolis measuring tube 1 oscillates within the compensating cylinder 6 at the fundamental, first harmonic, at full wavelength, and FIGS. 2 and 1, viewed together, reveal that the detectors 4, 5 are positioned at a point of low amplitude of the excitation oscillation.

FIGS. 2 and 3 show in schematic fashion the side walls 15, 16 of the compensating cylinder 6. If these side walls 15, 16 are suitably rigid and if the Coriolis measuring tube 1 is appropriately clamped down within the compensating cylinder 6, i.e. within the side walls 15, 16, the result will be that the pipes 17 connected to either end between the Coriolis measuring tube 1 and the mounting flanges will not vibrate. Consequently, the mass flowmeter according to this invention may be shorter in length since it is not necessary to provide a "soft" connection of the Coriolis measuring tube 1 to the mounting flanges 8, 9.

As has been explained further above, the mass flowmeter according to this invention is based on a concept whereby the center of mass of all of the components within the compensating cylinder 6 in their entirety remains at a fixed stationary point, meaning that the center of mass of the entire assembly consisting of the Coriolis measuring tube 1, the oscillators 2, 3, the detectors 4, 5, the balancing elements 10, the retaining devices 11, 12 and the equalizing pendulum 13 will always remain fixed irrespective of the excitation oscillation and of the Coriolis oscillation. This fixed position of the center of mass of the entirety of the components within the compensating cylinder 6 irrespective of the excitation oscillation and of the Coriolis oscillation is maintained by suitably selecting the balancing elements 10, the length A of the retaining devices 11, 12, the distance B between the retaining devices 11, 12 and the center transverse axis M of the Coriolis measuring tube 1, and the length C of the equalizing pendulum 13.

FIGS. 2 and 3 are schematic illustrations of the mass flowmeter according to this invention pursuant to FIG. 1, respectively reflecting the excitation oscillation of the Coriolis measuring tube (FIG. 2) and the Coriolis oscillation of the Coriolis measuring tube (FIG. 3), with the underlying functional features of this invention shown in extremely exaggerated fashion. The important aspect is that both in the presence of the excitation oscillation of the Coriolis measuring tube 1 and, respectively, of the Coriolis oscillation of the Coriolis measuring tube 1, the balancing elements 10 provide compensating or equalizing oscillations which counter the excitation oscillation and, respectively, the Coriolis oscillation. In FIGS. 2 and 3, this is shown, in physically extremely exaggerated form, by a positioning of balancing elements 10 on the far side of the longitudinal axis L facing away from the Coriolis measuring tube 1. In reality, of course, in the embodiment of a mass flowmeter according to this invention according to FIG. 1, the balancing elements 10 would not be positioned on only one side of the Coriolis measuring tube 1. Instead, the distance D between the center of mass of the balancing elements 10 and the longitudinal axis L of the Coriolis measuring tube 1 will vary. That distance D equals zero when there is no effective excitation oscillation nor Coriolis oscillation. As indicated in FIG. 2, the center of mass of the balancing elements 10 will be at a distance D below the longitudinal axis L of the Coriolis measuring tube 1 whenever, due to the excitation oscillation, the Coriolis measuring tube 1 is located above the longitudinal axis L.

In conclusion it should be stated that the term center axis M of the Coriolis measuring tube 1 and the term longitudinal axis L of the Coriolis measuring tube 1 refer in each case to the center axis and, respectively, longitudinal axis in the "quiescent" state of tile Coriolis measuring tube 1.

What is claimed is:

1. A mass flowmeter operating by the Coriolis principle, with one essentially straight, moving-fluid-conducting Coriolis measuring tube (1), at least one oscillator (2, 3) associated with and exciting the said Coriolis measuring tube (1), at least one detector (4, 5) associated with the Coriolis measuring tube (1) and serving to measure at least one of Coriolis forces and Coriolis oscillations derived from Coriolis forces, and a compensating cylinder (6), the said Coriolis measuring tube (1) being positioned within and mechanically connected to the compensating cylinder (6), wherein in a symmetrical arrangement relative to the center transverse axis (M) of the Coriolis measuring tube (1), the Coriolis measuring tube (1) is provided with balancing elements (10) and retaining devices (11, 12), the balancing elements (10) are respectively attached to said retaining devices (11, 12) and the resonant frequency of the oscillatory system derived from the balancing elements (10) and the retaining devices (11, 12) is specifically selected to differ from the frequency of the excitation oscillation.

2. The mass flowmeter according to claim 1, characterized in that the retaining devices (11, 12) are in the form of tubular elements.

3. The mass flowmeter according to claim 1 or 2, characterized in that each retaining device (11, 12) supports two balancing elements (10).

4. The mass flowmeter according to claim 1 or 2 characterized in that at least one of the oscillators (2, 3) and the detectors (4, 5) is attached to the retaining devices (11, 12).

5. The mass flowmeter according to claim 1 or 2 characterized in that the Coriolis measuring tube (1) is provided with a centrally positioned equalizing pendulum (13).

6. The mass flowmeter according to claim 1 or 2 characterized in that the compensating cylinder (6) is provided with a symmetrically configured balancing assembly (14) positioned in an essentially symmetrical arrangement relative to the center transverse axis (M) of the Coriolis measuring tube (1).

7. The mass flowmeter according to claim 1 or 2 characterized in that the Coriolis measuring tube (1) oscillates within the compensating cylinder (6) at its fundamental first harmonic and at full wavelength.

8. The mass flowmeter according to claim 1 or 2 characterized in that the detectors (4, 5) are positioned at a point of low amplitude of the excitation oscillation.

* * * * *